March 10, 1970 — C. W. ATWELL — 3,499,420
BEDDING COMPOSITION AND PACKAGING FOR WORMS
Filed May 3, 1968
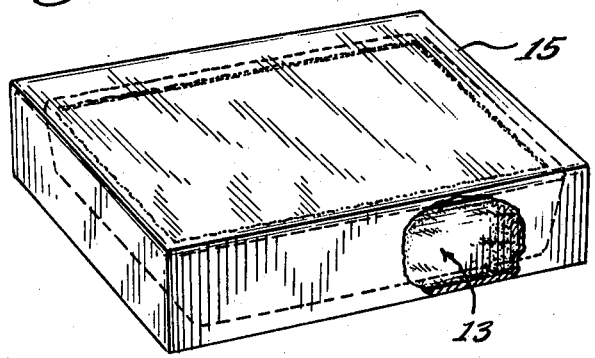
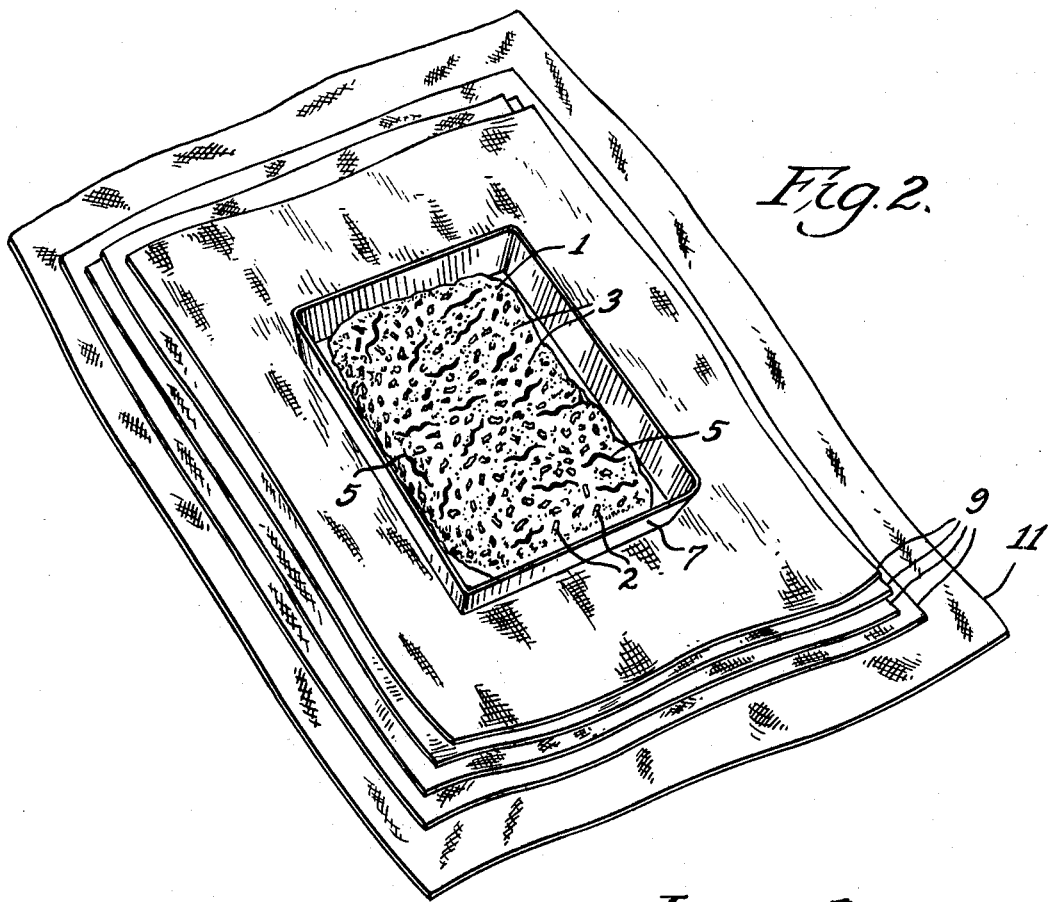
Inventor
Charles W. Atwell.
By Mann, Brown and McWilliams.
Attys.

United States Patent Office 3,499,420
Patented Mar. 10, 1970

3,499,420
BEDDING COMPOSITION AND PACKAGING FOR WORMS
Charles W. Atwell, 230 Kellar Lane, Decatur, Ill. 62523
Filed May 3, 1968, Ser. No. 726,311
Int. Cl. A01k 29/00
U.S. Cl. 119—1                                                          8 Claims

ABSTRACT OF THE DISCLOSURE

A bedding composition composed of approximately equal portions of black foamy dirt, moisture saturated cellulose fiber such as shredded paper, and shredded corn cob, also preferably containing a small amount of finely divided sugar limestone to help control acidity and provide grit material in which worms such as night crawlers can be kept alive for long periods without refrigeration if the composition containing the night crawlers is enclosed in a moisture-proof wrapper or container such as aluminum foil and then insulated to provide against substantial temperature change by enclosing the wrapper or container in layers of paper or in other heat-insulating enclosure.

Brief summary of the invention

Night crawlers are commonly used as bait for fishing. Because of the difficulty of keeping night crawlers alive for any period of time, fishermen usually find it necessary to purchase a new supply of worms each time they go fishing because the bait cannot be kept alive without refrigeration.

The present invention provides a means for keeping night crawlers alive for long periods of time—up to one year—by providing a bedding composition composed principally of a homogeneous mixture of water-saturated cellulosic fiber, shredded corn cob and black foamy acid-free dirt. The cellulose fiber acts as a food material. The shredded corn cob serves to keep the bedding composition in a moist, spongy condition so that the worms do not smother, and, in addition, serves as food material when the cellulosic material is used up. A small amount of finely divided limestone commonly known as sugar limestone is also added to provide grit material, and also to help counteract acidity and control mold within the package. After the worms are bedded in the bedding composition it is enclosed in a metal foil or other moisture-impervious wrapper or container and then wrapped with heat-insulation material such as excelsior, paper cuttings or a plurality of layers of cheap paper in order to maintain the interior of the package cool. The package is then placed in a container made of cardboard, corrugated board, wood or foamed plastic material which provides additional heat insulation and also suitable packaging means for shipping the contents.

Night crawlers when so packaged will remain alive for periods up to one year and, in fact, are able to multiply. Moreover, the bedding material which is left after the worms are used is a valuable fertilizer for flowers or other plant life.

It is an object of the invention to provide a bedding composition in which live night crawlers can be embedded and kept alive for extended periods of time without the necessity of refrigeration. It is another object of the invention to provide a package of live worms in which the worms stay alive for long periods of time and which package can be transported or shipped by mail without harm to the worms.

Brief description of the drawing

FIGURE 1 is a perspective view of a package in accordance with the invention showing it open to expose the various layers and contents; and FIGURE 2 is a perspective view of the closed package in accordance with the invention.

Detailed description

In accordance with the invention, a bedding material is prepared by mixing together black foamy earth, shredded paper which has been thoroughly soaked in water until it is completely saturated with moisture, and crushed and shredded corn cobs. To this mixture may be added a small amount of finely divided limestone.

In preparing the bedding composition, I prefer to mix the ingredients in approximately the following proportions by weight: black foamy earth—25%; moisture saturated shredded paper—50%; and shredded corn cobs—25%. To this mixture is preferably added a small amount of finely divided limestone in the form of sugar limestone in the amount of about one ounce per one to two pounds of the mixture of earth, shredded paper and shredded corn cob.

The earth forms a natural habitat in which the worms are accustomed to exist and provides some grit material. The shredded paper or other cellulosic fiber furnishes the major portion of the food requirements and moisture for the worms. The shreddd corn cob is used principally to hold moisture and to keep the composition in a spongy condition. In addition, it provides food value, as the cobs and paper at the end of the eight or nine months becomes fertilizer resembling dirt. Corn cobs by themselves are not a good food for night crawlers, but when ingested together with the paper or other cellulosic material and repeatedly excremented, the excrement functions to keep the worms alive for prolonged periods.

Although I have mentioned shredded paper as the source of cellulosic material, any form of finely divided cellulose preferably made from wool pulp can be used. For economic reasons I prefer to use old shredded cardboard boxes, bags and wrapping paper. Newspapers should be avoided since the ink is harmful to the live worms.

Although I have above given the portions of the various components for the bedding composition as the preferred proportions, the proportions may vary depending on the length of time it is desired to keep the worms alive and the number of worms embedded in a given amount of the composition. The specific composition above described, when used in the amount of approximately one pound per three dozen average size night crawlers, will keep the night crawlers alive for a period of approximately one year, and, in addition, will permit the night crawlers to multiply. If it is not necessary to keep the night crawlers alive for as long a period as a year, or if a smaller number of night crawlers is embedded, the amount of cellulosic material may be decreased in direct proportion to the time and/or the number of night crawlers. For example, if it is desired to keep the night crawlers alive for a period of six months instead of one year, the amount of cellulosic material can be cut approximately in half.

The amount of crushed and shredded corn cob which may be incorporated may be increased or decreased to some extent so long as a sufficient amount is present to keep the composition spongy or highly porous. Here again the amount will depend to some extent on the number of night crawlers present and the length of time which it is desired to keep them alive. However, I prefer not to use an amount of corn cob less than about 15% of the entire composition and the amount may be more than 25% of the entire composition.

I prefer to use a black earth which has as low acidity as possible. To counteract any acidity that may be present in the earth, a small amount of limestone is added. The limestone also provides grit material which the worms need for feeding since the worms do not have a stomach but only a gizzard.

Referring more particularly to the drawing, the numeral 1 indicates black earth with which is intermixed cellulosic, shredded fibers 2 and shredded corn cob 3. Embedded in the mixture are night crawlers 5. The bedding composition containing the night crawlers is enclosed in a moisture-proof wrapping material or container 7. Although I prefer to use thin metal sheet or foil such as aluminum sheet or foil as moisture-proof containers or wrapping material, any other material which provides a moisture barrier and which is capable of conducting heat away from the contents of the package, may be used. The bedding material should have a minimum thickness of not less than about one inch, and preferably at least two and one-half inches, to provide a suitable habitat for the earth worms. The thickness of the bedding may be three inches or more.

The package is shown in open condition in FIGURE 2 to illustrate the various layers of wrapping material which are used. As shown in FIGURE 2 there are four additional sheets of wrapping material 9 and an outside wrapper 11, each of which is wrapped separately about the inner aluminum container package in order to provide insulation. Although four insulating sheets are shown, the number can be greater or less depending on the variation in temperature conditions to which the package is to be subjected. For example, if it is intended to transport the package from between points of extreme change of temperature, additional insulating layers may be used. On the other hand, where the package is to be transported under climatic conditions where the temperature stays within a relatively narrow range as, for example, 50 to 75 degrees F., less heat insulation is required and the number of layers of wrapping material may be less than four. Any type of wrapping material which has heat insulating properties such as excelsior, cut-up paper, kraft paper, corrugated board or newspaper may be used for the insulating wrappers. The outside wrapper 11 is merely a finishing wrapper to give the package an aesthetic appearance.

It is not necessary that the individual heat insulating wrappers be sealed, although they may be if desired. The outside wrapper 11 is preferably sealed or tied in order to keep the package from coming apart. Any suitable type of sealing may be used, such as, for example, pressure sensitive adhesive tape.

The finished package is shown in dotted lines by the numeral 13 in FIGURE 1. The container for the bedding composition and night crawlers is made of thin sheet aluminum with an aluminum cover fastened thereto by crimping the edges of the container over the edge of the cover in the manner commonly used for packaging food products for making air-tight packages. In order to provide additional heat insulating means and to prevent injury to the package, the entire package 13 is enclosed within a box 15 made of cardboard, corrugated board, wood or foam plastic material such as foamed polyurethane or polystyrene resin. The foamed resins are known to have good heat insulating properties, are lightweight and are relatively cheap. If desired the other insulating materials may be omitted and the bedding wrapped in a moisture-proof wrapping enclosed in a foamed plastic container.

The optimum temperature for maintaining night crawlers in healthy condition is about 40 to 44 degrees F. However, when packaged in accordance with my invention, it is not necessary to refrigerate the worms in order to keep them in healthy live condition.

Earth worms such as night crawlers, when embedded in the composition above described and packaged as previously set forth, are capable of remaining alive and healthy for periods as long as one year. Not only do they remain alive, but they are able to multiply. As an example, twelve night crawlers were placed in a bedding composition prepared by homogeneously mixing one part black foamy earth of low acidity or slightly alkaline, that is, having a pH above 6 and below 8, one-fourth of cardboard which was shredded in a hammer mill into a cotton-like form and soaked at least twelve hours until it became soft and completely saturated with moisture and then adding thereto one-fourth part of crushed corn cobs which had been put through a hammer mill. To this mixture was added one tablespoon of sugar limestone per two pounds of mixture. The entire composition was spread in a bed approximately one inch thick and there were embedded therein twelve night crawlers for a period of approximately three and one-half months. The night crawlers were two months old at the time they were embedded. The package during the three and one-half months had been transported in the trunk of a car from Illinois to Florida and back. At the end of the period there were fifteen night crawlers in the package.

An additional advantage of the invention is that the bedding material constitutes a valuable fertilizer for flowers and other plant life after it has served as a bedding for the night crawlers. The cellulosic feed material passes through the worms may times and the excrement mixed with the dirt becomes a valuable manure.

I claim:
1. A composition for packaging night crawlers comprising:
   (a) black dirt of low acidity;
   (b) moisture-soaked, finely divided cellulosic material;
   (c) a minor portion of shredded corn cobs; and
   (d) a relatively small amount of finely divided limestone;
      the cellulosic material being present in larger amounts than any of the other components.
2. A composition in accordance with claim 1 in which the composition contains:
   (e) about 25 parts by weight of black dirt;
   (f) about 50 parts by weight of moisture-soaked finely divided cellulosic material; and
   (g) about 25 parts by weight of shredded corn cobs.
3. A composition in accordance with claim 2 in which:
   (h) the black dirt is foamy; and
   (i) the cellulosic material is shredded carboard.
4. A composition in accordance with claim 2 in which:
   (j) the limestone is present as sugar limestone in the amount of about one ounce per two pounds of composition.
5. A package comprising:
   (a) the composition of claim 1;
   (b) live night crawlers embedded in said composition;
   (c) a water impermeable enclosure for said composition and embedded night crawlers; and
   (d) a heat insulating material surrounding said water impermeable enclosure.
6. A package comprising:
   (a) the composition of claim 4;
   (b) live night crawlers embedded in said composition;
   (c) a thin aluminum container for said composition and embedded night crawlers; and

(d) a plurality of layers of paper covering said aluminum foil enclosure.

7. A package in accordance wtih claim 6
(e) enclosed in a paperboard box.

8. A package in accordance with claim 7 in which said composition is not less than about two and one-half inches in thickness.

References Cited

UNITED STATES PATENTS

| | | | |
|---|---|---|---|
| 2,527,214 | 10/1950 | Graves | 119—1 |
| 2,841,113 | 7/1958 | Ebert | 119—1 |
| 2,867,055 | 1/1959 | Lebiedzinski | 43—55 |
| 3,115,864 | 12/1963 | Wagner | 119—1 |

ALDRICH F. MEDBERY, Primary Examiner

U.S. Cl. X.R.

43—55